US011110623B2

(12) United States Patent
Marcon

(10) Patent No.: US 11,110,623 B2
(45) Date of Patent: Sep. 7, 2021

(54) TOOL FOR CUTTING PANELS, IN PARTICULAR MADE OF RECONSTITUTED MATERIAL

(71) Applicant: ÉTABLISSEMENTS PIERRE GRÉHAL ET CIE SA, Baillet en France (FR)

(72) Inventor: Lionel Marcon, Parmain (FR)

(73) Assignee: ETABLISSEMENTS PIERRE GREHAL ET CIE SA, Baillet-en-France (FR)

( * ) Notice: Subject to any disclaimer, the term of this patent is extended or adjusted under 35 U.S.C. 154(b) by 0 days.

(21) Appl. No.: 16/032,110

(22) Filed: Jul. 11, 2018

(65) Prior Publication Data

US 2019/0016003 A1 Jan. 17, 2019

(30) Foreign Application Priority Data

Jul. 16, 2017 (FR) ...................................... 1756721

(51) Int. Cl.
| | | |
|---|---|---|
| B26D 1/30 | (2006.01) | |
| B26D 7/01 | (2006.01) | |
| B26D 7/08 | (2006.01) | |
| B23D 33/02 | (2006.01) | |
| B23D 17/08 | (2006.01) | |

(Continued)

(52) U.S. Cl.
CPC ............... B26D 1/30 (2013.01); B23D 17/08 (2013.01); B23D 33/02 (2013.01); B26D 7/0006 (2013.01); B26D 7/01 (2013.01); B26D 7/08 (2013.01); B26D 2001/0066 (2013.01)

(58) Field of Classification Search
CPC . B26D 1/30; B26D 1/305; B26D 7/01; B26D 7/015; B23D 33/02; B23D 17/08

USPC ............................................................ 83/605
See application file for complete search history.

(56) References Cited

U.S. PATENT DOCUMENTS

| | | | | |
|---|---|---|---|---|
| 2,563,741 | A * | 8/1951 | Patton ................... | B23D 17/08 83/136 |
| 2002/0066447 | A1* | 6/2002 | Gaidjiergis ............ | A62B 3/005 125/23.01 |
| 2015/0197027 | A1* | 7/2015 | Marcon .................... | B26D 7/01 83/467.1 |

FOREIGN PATENT DOCUMENTS

| | | | |
|---|---|---|---|
| DE | 20 2005 010660 | 10/2005 | |
| DE | 102009003490 A1 * | 8/2010 | ............... B26D 1/30 |
| DE | 102009043992 A1 * | 1/2011 | ............ B28D 1/223 |

(Continued)

OTHER PUBLICATIONS

English translation of FR612747. (Year: 1994).*
English translation of DE102009043992. (Year: 2011).*
English translation of KR1600471. (Year: 2016).*

*Primary Examiner* — Jennifer S Matthews
(74) *Attorney, Agent, or Firm* — Clark & Brody LP

(57) ABSTRACT

A tool for cutting a panel made of reconstituted material comprises a fixed support on which a blade is mounted so as to be able to pivot. A slot is provided which is designed to receive at least part of the blade during cutting. A movable support is mounted so as to be able to move about the rotation pin (21), between an engagement position in which the movable support is arranged along the longitudinal edges of the slot of the fixed support, and a retracted position in which the movable support is arranged spaced apart from the longitudinal edges of the slot of the fixed support. The movable support comprises a slot of width smaller than the width of the slot of the fixed support and greater than the width (Lt) of the blade.

11 Claims, 4 Drawing Sheets

(51) Int. Cl.
*B26D 7/00* (2006.01)
*B26D 1/00* (2006.01)

(56) References Cited

FOREIGN PATENT DOCUMENTS

| | | | | |
|---|---|---|---|---|
| DE | 10 2011 050664 | | 11/2012 | |
| DE | 102011050664 | * | 11/2012 | |
| EP | 2083972 B1 | * | 1/2013 | ............ B28D 1/223 |
| EP | 2 902 157 | | 8/2015 | |
| EP | 2 907 630 | | 8/2015 | |
| EP | 2902157 B1 | * | 9/2016 | ............... B26D 1/30 |
| FR | 847014 A | * | 10/1939 | ............ B28D 1/223 |
| FR | 2696121 A1 | * | 4/1994 | ........... B26D 7/2628 |
| FR | 3025738 | * | 3/2016 | |
| KR | 1600471 | * | 3/2016 | |
| WO | 2006/095065 | | 9/2006 | |
| WO | WO-2006095065 A1 | * | 9/2006 | ........... B26D 1/0006 |
| WO | 2008/049976 | | 5/2008 | |

* cited by examiner

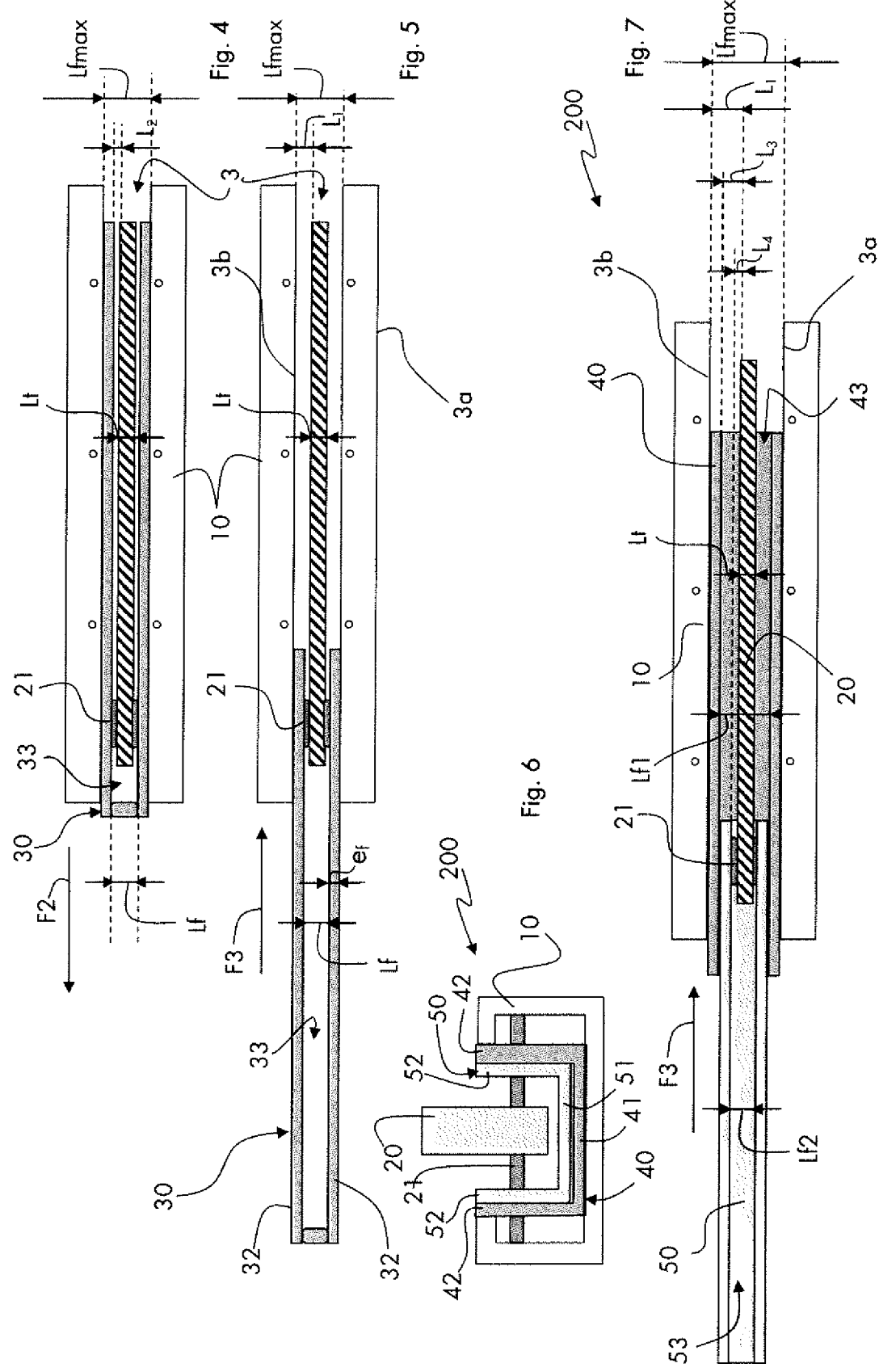

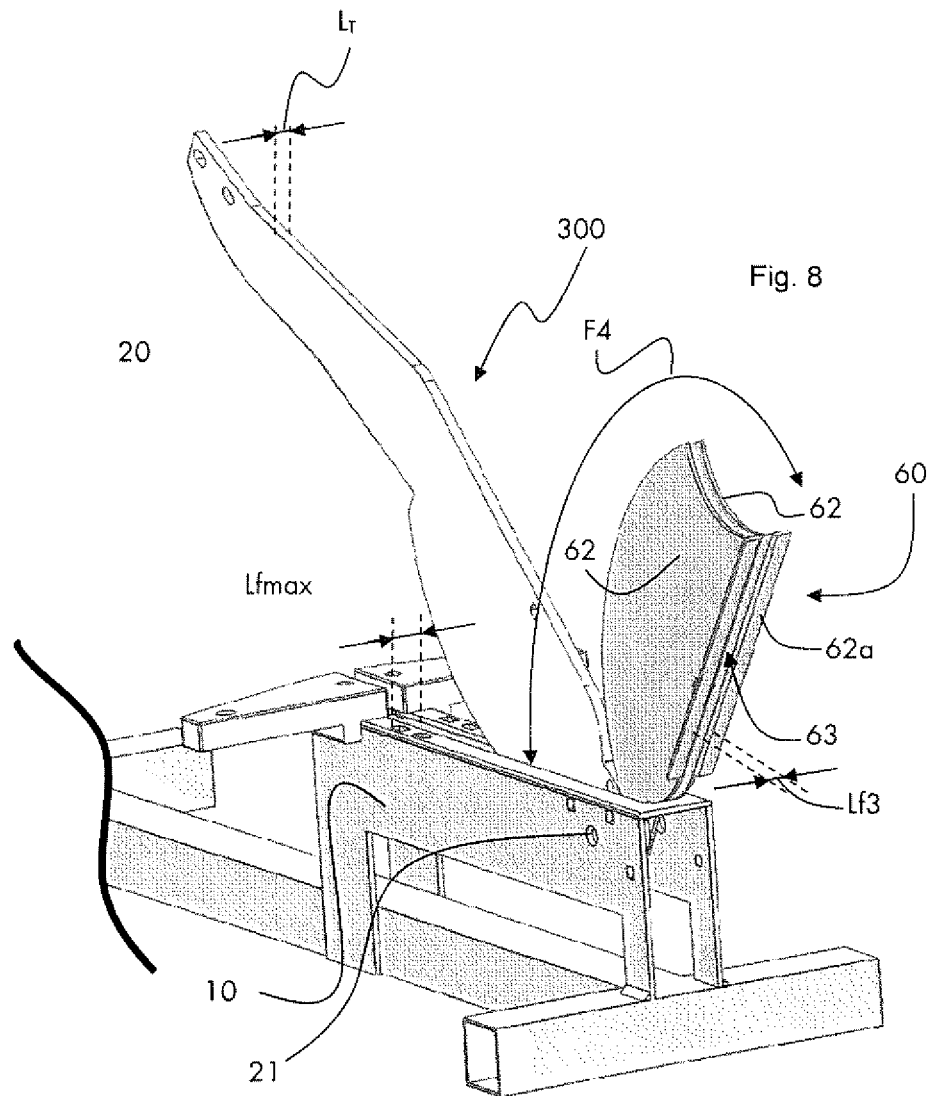

TOOL FOR CUTTING PANELS, IN PARTICULAR MADE OF RECONSTITUTED MATERIAL

The invention relates to a tool for cutting a panel, in particular a panel made of reconstituted material.

Nowadays, in the field of construction, use is frequently made of construction elements formed or reconstituted from materials that exist in or are broken down into the form of powder, fibres, granules or shavings. Thus, by way of non-limiting examples, use is made of tiles or boards of plasterboard, cement or ceramic as building or finishing elements, cladding panels made of fibre cement, panels of medium-density cellulose-fibreboard, panels of reconstituted slate as cladding or finish panels, and laminated panels as floating floor elements. Because of the nature of the mixture of components from which the panels are made or because of the use to which the panels are put, the panels have two characteristics in common: the hardness of the panel, or at least of the working face thereof, and the thickness thereof.

When the panels are made of a reconstituted material that combines hardness with thickness, it is necessary to have use of a tool capable of overcoming these two cutting difficulties.

There are a great many tools in existence capable of cutting such panels. Nevertheless, because these panels are fitted on site, the tool needs to be suited to site use, i.e. to being used outside of a workshop.

Such a tool is described for example in documents WO2006095065 and EP2083972. It is a cutting tool for cutting a panel made of a reconstituted material, the tool comprising a support on which a blade is mounted via a pivot so that it can pivot between an open position for receiving, between the support and the blade, the panel that is to be cut, and a closed position at the end of cutting. The blade has a flat and curved cutting edge and is provided with a handle. As the hardness of the panels that are to be cut is generally high, a lever arm is generally provided, between the handle and the blade, so that a greater force can be applied.

The support comprises a slot intended to receive at least part of the blade during cutting.

By collaborating with the edges of the slot, the blade performs a double scissors action: the flat and clean cutting edge of the blade slides along the longitudinal edges of the slot, like two pairs of scissors. This double scissors action means that the blade does not, during cutting, penetrate the panel that is to be cut in the usual way in order to split it, but removes a strip of material from the panel, the width of this strip more or less corresponding to that of the blade. Although a scissor action of this kind does not appear to expose the blade to the risk of flexing or bending, it is still the case that the movements of the person using the tool are such that they might, involuntarily, introduce a force transverse to the plane of the cut, which could deform the blade.

Thus, in order to avoid the blade of such a tool twisting as it cuts, it has been proposed to strengthen all of the structures of the tool. For example, document EP2083972 proposes providing the blade with a reinforcing groove. More generally, the support is also dimensioned so as to provide optimal stiffness.

In the patent EP2902157, the applicant noticed that, surprisingly, when using a slot of width greater than the width of the blade, the panel of material was perfectly cut on the face in contact with the blade. Moreover, the force required for cutting is lower than that required with a tool of the prior art. Thus, while having the same cutting capacity, the tool is smaller than a tool of the prior art.

Thus, there is less risk of the blade twisting, and it is possible to reduce the stiffness and the cost of the tool by using less primary material. Equally, with an equivalent quantity of primary material, the tool according to the prior art can cut thicker panels of material, requiring a large cutting force.

In this patent, the invention proposes covers provided with slots of different sizes, to be chosen according to the panel to be cut.

Although the tool works perfectly well, handling and storage of the covers can be problematic. Indeed, on site or outdoors the covers can be lost or damaged when they are not used.

Document DE102011050664 describes a cutting tool whose slot width is adjustable by means of two rails that slide along the two edges of the slot. The implemented mechanism is complex and not very sturdy since the sliding edges are held in position by a screw that can come loose. Moreover, without these rails, the edges are unusable since they reveal part of the immobilizing mechanism. Finally, these rails can be lost.

The aim of the present invention is to propose a high-performance tool for cutting panels made of reconstituted material, wherein this tool is simple and cost-effective, requires a smaller cutting force than the tools of the prior art, and is suitable for use on a building site while maintaining its setting during use, and with no risk of parts being lost.

"High-performance" is to be understood as meaning that the cut must be precise, at least on one of the faces (the cut over the thickness of the panel can be less precise when this thickness is not visible in the final installation). Thus, the cut must be clean on at least one of the faces, and the cutting angle must be constant. Thus, the invention relates to a cutting tool for cutting a panel which is made of reconstituted material and which has a given thickness, the tool comprising a fixed support on which a blade, having a given blade width, is mounted so as to be able to pivot by means of a pivot, between an open position for receiving, between the support and the fixed blade, the panel which is to be cut, and a closed position at the end of a cut, the fixed support comprising a portion that is provided with a slot which is designed to receive at least part of the blade during the cut, the slot comprising two longitudinal edges that are spaced apart from one another by a slot width which is strictly greater than the blade width such that the blade is spaced apart from each longitudinal edge of the slot and does not come into contact with said longitudinal edges of the slot when passing from the open position to the closed position, the cutting tool comprising at least one movable support that is mounted so as to be able to move about the rotation pin of the blade between an engagement position in which the movable support is arranged along the longitudinal edges of the slot of the fixed support, and a retracted position in which the movable support is arranged spaced apart from the longitudinal edges of the slot of the fixed support, said at least one movable support comprising a slot of width smaller than the width of the slot of the fixed support, and greater than the width of the blade.

Since the movable support(s) are held captively with the rotation pin, there is no risk of their being lost.

According to other embodiments:
said at least one movable support may comprise a cutout in which is engaged the rotation pin of the blade, such that the movable support is mounted so as to be able to move about the rotation pin of the blade, between the engagement position and the retracted position;

the movable support may comprise two longitudinal flanks that are spaced apart from one another by a distance smaller than the slot width between the two longitudinal edges of the fixed support and greater than the width of the blade, each flank being provided with a cutout in which is engaged the rotation pin of the blade, such that the movable support is mounted so as to be able to move about the rotation pin of the blade, between the engagement position and the retracted position;

the cutout borne by the movable support may be oblong, such that the movable support is mounted so as to be able to slide with respect to the rotation pin of the blade;

each flank may comprise a bearing portion that is designed to slide along the edges of the slot of the fixed support, and a guiding portion that is arranged against the fixed support, at a distance from the bearing portion, such that the movable support is guided in translation;

the fixed support may comprise an adjustment slot in which is mounted, so as to be able to slide, a gripping tab that is fixed to the movable support;

the cutout borne by the movable support may be circular, such that the movable support is mounted so as to be able to pivot with respect to the rotation pin of the blade;

the movable support may comprise two longitudinal flanks, each one provided with a bearing portion designed to cover the longitudinal edges of the slot of the fixed support in the engagement position;

when the blade is in the closed position and the movable support is in the retracted position, the blade may be spaced apart from each longitudinal edge of the slot of the fixed support by a gap that is equal to or greater than a thickness of a first panel that is to be cut, and, when the blade is in the closed position and the movable support is in the engagement position, the blade may be spaced apart from each longitudinal edge of the slot of the movable support by a gap that is equal to or greater than a thickness of a second panel that is to be cut, of thickness less than the thickness of the first panel to be cut; and/or the blade may be mounted so as to be able to pivot on the support by means of a pivot provided with spacers of a given thickness so that the blade is spaced apart from the longitudinal edges of the slot during cutting.

Other features of the invention will be set out in the following detailed description, provided with reference to the appended drawings, in which:

FIG. 4 is a schematic top view of the cutting tool of FIG. 2;

FIG. 5 is a schematic top view of the cutting tool of FIG. 3;

FIG. 6 is a schematic view in cross section of a second embodiment of a cutting tool according to the invention, comprising multiple movable supports;

FIG. 7 is a schematic top view of the embodiment of FIG. 6, in which the first movable support is in the engagement position and the second movable support is in the retracted position; and FIG. 8 is a schematic perspective view of a third embodiment of a tool for cutting panels made of reconstituted material, according to the invention, whose movable support is able to pivot.

FIGS. 1, 2 and 3 illustrate a first embodiment of a tool 100 for cutting panels made of reconstituted material, having a given thickness e1 or e2 (not shown).

Figure 1:
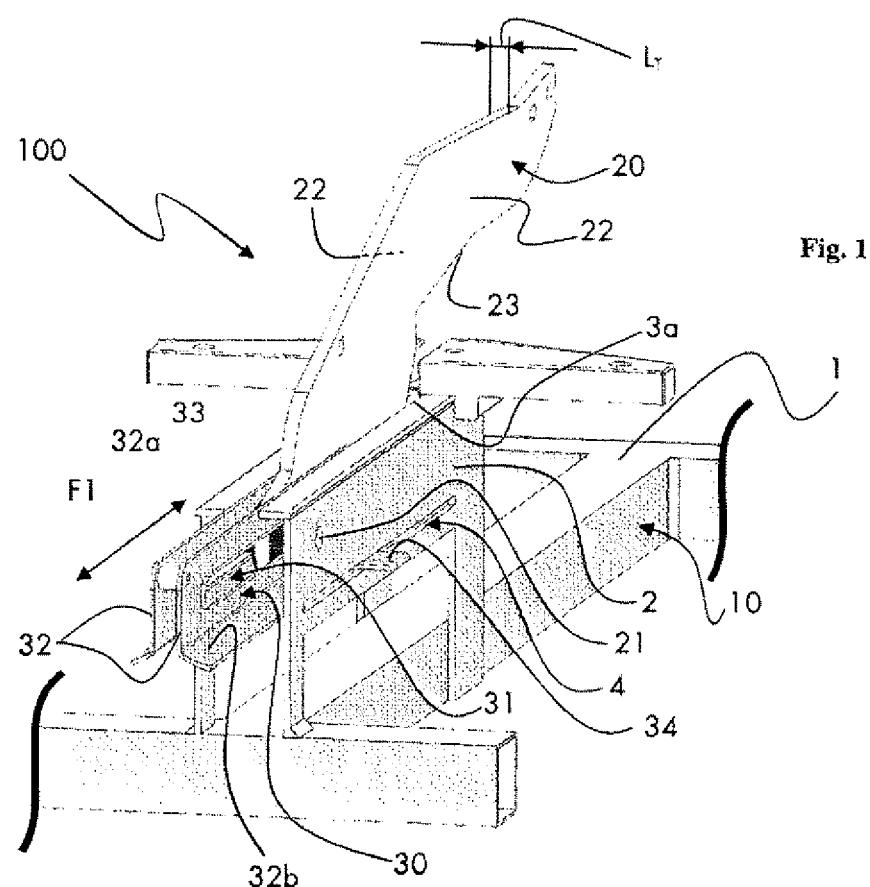
FIG. 1 is a schematic perspective view of a preferred embodiment of a tool for cutting panels made of reconstituted material, according to the invention, whose movable support is able to slide.

The tool 100 comprises a fixed support 10 and a blade 20 that is mounted so as to be able to pivot on the fixed support by means of a pivot 21, between an open position for receiving, between the support 10 and the blade 20, the panel that is to be cut, and a closed position at the end of a cut.

The blade 20 has two side faces 22 that are connected by a smooth and flat cutting edge 23 having a given blade width Lt.

The fixed support 10 comprises a subframe portion 1 and a fixed support portion 2 for the blade 20, this support portion 2 comprising a slot 3 (see FIG. 5) that is designed to receive at least part of the blade 20 during the cut.

The slot 3 comprises two longitudinal edges 3a-3b that are spaced apart from one another by a slot width Lfmax strictly greater than the blade width Lt, such that the blade 20 is spaced apart from each longitudinal edge 3a-3b of the slot 3 by a gap L1 equal to (Lfmax−Lt)/2. Thus, the blade never comes into contact with said longitudinal edges of the slot when passing from the open position to the closed position.

This gap L1=(Lfmax−Lt)/2 is suitable for cutting a first panel made of reconstituted material, having a given thickness e1.

Figure 2:
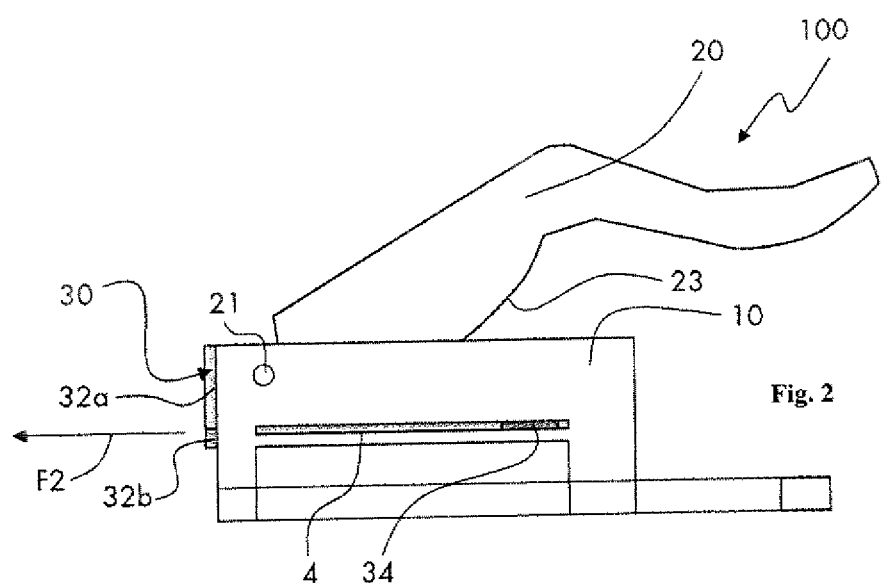
FIG. 2 is a schematic side view of the cutting tool of FIG. 1, whose movable support is in the engagement position.
Figure 3:
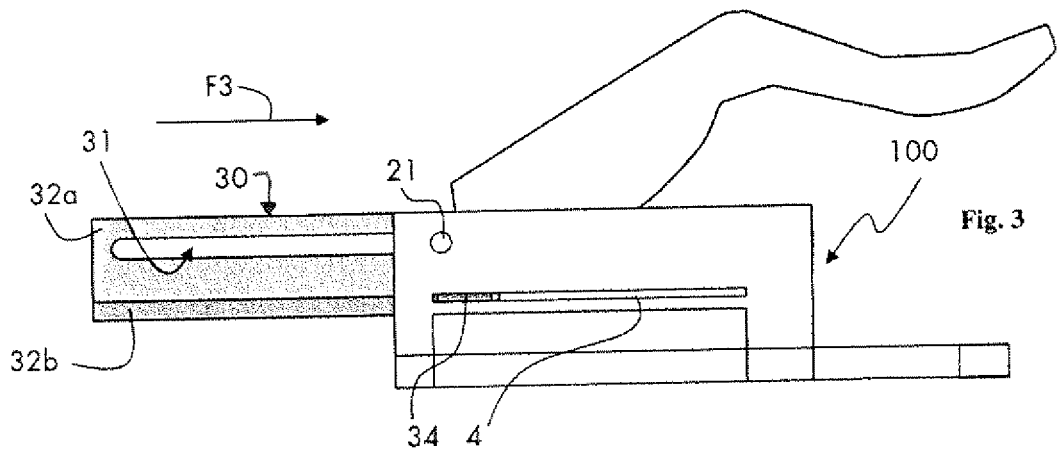
FIG. 3 is a schematic side view of the cutting tool of FIG. 1, whose movable support is in the retracted position.

According to the invention, the tool 100 also comprises a movable support 30 that is mounted so as to be able to move about the rotation pin 21 of the blade 20, between an engagement position (see FIGS. 2 and 4) and a retracted position (see FIGS. 3 and 5).

The movable support 30 comprises a slot 33 of width Lf smaller than the width Lfmax of the slot 3 of the fixed support, and greater than the width Lt of the blade 20. For example, Lfmax is equal to 14 mm (for cutting panels of thickness e1 between 9 mm and 3 mm, in particular laminated panels) and the width Lf of the slot 33 is equal to 10 mm (for cutting panels of thickness e2 less than 9 mm, in particular those made of PVC).

The movable support 30 is provided with a cutout 31 in which the rotation pin 21 of the blade 20 is engaged, such that the movable support 30 is mounted so as to be able to move about the rotation pin 21 of the blade 20, between the engagement position in which the movable support 30 is arranged along the longitudinal edges 3a-3b of the slot 3 of the fixed support 10, and the retracted position in which the movable support 30 is arranged spaced apart from the longitudinal edges 3a-3b of the slot 3 of the fixed support 10.

In the embodiment of FIGS. 1 to 5, the cutout 31 for engagement of the rotation pin 21 of the blade 20, borne by the movable support 30, is oblong such that the movable support is mounted so as to be able to slide with respect to the rotation pin, in the direction of the arrow F1.

In the embodiment of FIG. 1, the movable support 30 comprises two planar longitudinal flanks 32 that are spaced apart from one another by a distance Lf smaller than the slot width Lfmax between the two longitudinal edges 3a-3b of the fixed support 10, and greater than the width Lt of the blade 20.

In other words, in this embodiment, the flanks 32 each have a thickness ef equal to (Lfmax−Lf)/2. Thus, the choice of thickness ef of the flanks determines the gap L2 (see FIG. 4) between the blade and the edges of the slot 33 of the movable support, in this case delimited by the flanks, when the movable support is in the engagement position.

Alternatively, the longitudinal flanks constituting the movable support may be L-shaped. In this case, it is the width of the horizontal leg, in the engagement position, which determines the gap L2 between the free edge of the leg of each flank and the blade 20.

This gap L2, equal to =(Lf−Lt)/2 is suitable for cutting a second panel made of reconstituted material, having a given thickness e2 (not shown).

Thus, as shown in FIGS. 4 and 5, when the blade is in the closed position and the movable support 30 is in the retracted position (FIG. 5), the blade 20 is spaced apart from each longitudinal edge 3a-3b of the slot of the fixed support by a gap L1 which is suitable for cutting a first panel to be cut, of thickness e1 (not shown).

When the user has to cut a panel of thickness e2 smaller than the thickness e1 of the first panel, the user pushes the movable support 30 in the direction of the arrow F3 such that, when the blade is in the closed position and the movable support is in the engagement position (FIG. 5), the blade 20 is spaced apart from each longitudinal edge of the slot 33 of the movable support 30 by a gap L2 which is suitable for cutting the second panel to be cut, of thickness e2. Advantageously, each flank 32 comprises a bearing portion 32a that is designed to slide along the edges of the slot of the fixed support, and a guiding portion 32b that is arranged against the fixed support, at a distance from the bearing portion 32a, such that the movable support is guided in translation.

The movable support can thus be pulled or pushed by the user with precision and with no risk of twisting.

In order to make it easier for the user to grip the movable support 30, the fixed support 10 advantageously comprises an adjustment slot 4 in which is mounted, so as to be able to slide, a gripping tab 34 that is fixed to the movable support 30. In the embodiment shown, the gripping tab is fixed to one of the longitudinal flanks 32 of the movable support 30.

Thus, the user can pull the movable support 30 in the direction of the arrow F2 into the retracted position, or push it in the direction of the arrow F3 into the engagement position.

In a variant which is not shown, the fixed support comprises a means, such as a peg, for immobilizing the movable support in the engagement position. The movable support is then immobilized by a securing member set apart from the cutting zone, which avoids it being deactivated by the cutting action itself (for example by vibration or by an impact). For example, the fixed support and the movable support comprise orifices that are arranged opposite one another in the engagement position, such that the user can engage the peg therein in order to immobilize the movable support on the fixed support.

Alternatively, the securing member can immobilize the gripping tab of the movable support when the latter is in the engagement position.

In the embodiment of FIG. 1, the portion of the support 10 comprising the slot 3 consists of a plate bent into an inverted U shape, into the web of which a rectangular opening has been cut so as to create a slot 3 comprising two longitudinal edges 3a-3b that are spaced apart from one another by a given slot width Lfmax.

Alternatively, the portion 2 of the support comprising the slot 3 can consist of two plates bent into an inverted L, these being parallel to one another and spaced apart from one another so as to create a slot 3 comprising two longitudinal edges 3a-3b that are spaced apart from one another by a given slot width Lfmax (not shown).

As another alternative, it could be a plate previously cut to create a rectangular opening, then bent into an inverted U shape such that the opening forms the slot 3, and the part that has not been cut forms a shoulder (not shown).

A person skilled in the art will be able to adapt the shape of the movable support (planar flanks, flanks bent into an L shape, a C shape, a U shape or a Z shape) to that of the chosen fixed support, provided that, in the engagement position, the movable support reduces the slot width.

FIGS. 6 and 7 show the possibility of providing multiple movable supports 40-50. Of course, the shape of these must allow selective engagement in order to selectively reduce the width of the cutting slot.

In the embodiment shown, only two supports are represented, but it is possible to provide more.

In this exemplary embodiment, the movable supports 40-50 are U-shaped and stack one inside the other. They each have a central web, respectively 41 and 51, and two vertical legs, respectively 42 and 52.

They each have an oblong cutout (not shown in the figures) that receives the rotation pin 21 of the blade 20.

In FIG. 7, the movable support 40 is in the engagement position. The two legs 41 delimit a slot 43 of width Lf1 smaller than the width Lfmax of the slot 3 of the fixed support 10, and greater than the width Lt of the blade 20.

Thus, the blade 20 is spaced apart from each longitudinal edge of the slot 43 by a gap L3 equal to (Lf1−Lt)/2. Thus, the blade never comes into contact with said longitudinal edges of the slot when passing from the open position to the closed position.

This gap L3 is suitable for cutting a panel made of reconstituted material, having a given thickness e3 that is smaller than the thickness e1 of the panel that can be cut when the movable supports 40 and 50 are in the retracted position, and when the cutting slot is that delimited by the edges 3a-3b of the fixed support 10.

In order to cut a panel of thickness e4 smaller than the thickness e3, the user can push the second movable support 50 in the direction of the arrow F3, into the engagement position.

The movable support 50 comprises two legs 52 that delimit a slot 53 of width Lf2 smaller than the width Lfmax of the slot 3 of the fixed support 10, smaller than the width Lf1 of the slot 43 of the second movable support 40, and greater than the width Lt of the blade 20.

Thus, the blade 20 is spaced apart from each longitudinal edge of the slot 53 by a gap L4 which is equal to (Lf2−Lt)/2 and is suitable for cutting panels of thickness e3.

This makes it possible to choose a gap L1, L3 or L4 depending on the thickness of the panel that is to be cut.

FIG. 8 shows a third embodiment of a cutting tool 300 according to the invention, in which the movable support 60 is able to pivot about the rotation pin 21 of the blade 20, between the engagement position and the retracted position, the movable support 60 comprising a slot 63 of width Lf3 smaller than the width Lfmax of the slot 3 of the fixed support 10 and greater than the width Lt of the blade 20.

The movable support 60 shown comprises two longitudinal flanks 62 that are spaced apart from one another by the distance Lf3, each flank 62 being provided with a circular cutout (not shown in the figure) in which is engaged the rotation pin of the blade 20, such that the movable support 60 is mounted so as to be able to pivot with respect to the rotation pin, in the direction of the arrow F4. In FIG. 8, the movable support 60 is shown in the retracted position.

Advantageously, each longitudinal flank 62 consists of an L-shaped plate defining a bearing portion 62a that is designed to cover the longitudinal edges 3a-3b of the slot 3 of the fixed support 10 in the engagement position. In this case, the bearing portion 62a constitutes an end-of-travel stop while providing support, during cutting, for the panel that is to be cut.

Of course, in order to facilitate handling of this embodiment, the bearing portion 62a may further comprise a gripping member such as a perpendicular tab that is coplanar with the bearing portion 62a.

In general, the difference between the width Lfmax, Lf, Lf1, Lf2, Lf3 of the slot during use and the width Lt of the blade is such that the blade 20 is spaced apart from each longitudinal edge of the slot 3, 33, 43, 53, 63 by a gap L1, L2, L3, L4, L5 greater than or equal to 5% of the blade width Lt, preferably between 5% and 60% of the width Lt of the blade 20.

For example, if the blade has a width Lt of 6 mm, the gap L1 will be at least between 0.3 mm and 3.6 mm. In other words, the width Lfmax, Lf, Lf1, L12, Lf3 of the slot 3, 33, 43, 53, 63 is between 6.6 mm and 13.2 mm.

Not only does the presence of gaps between the blade and the edges of the slot permit easier cutting (that is to say requiring less force), but the forces required are reduced particularly, all else being equal, when the gaps are greater than or equal to the thickness e1, e2 of the panel that is to be cut.

In other words, the tool according to the invention preferably comprises, in use, a slot 3, 33, 43, 53, 63 whose width Lfmax, Lf, Lf1, Lf2, Lf3 is greater than or equal to twice the thickness e1, e2, e3 of the panel that is to be cut, plus once the thickness of the blade 20.

Sizing the slot so as to create a gap at least equal to the thickness of the panel that is to be cut makes it possible to cut thick panels without having to lengthen the lever arm required for cutting. "Equal" is understood to mean that each gap is between 80% and 120% of the thickness of the panel that is to be cut.

Thus, not only does the invention make it possible to create various gaps between the blade and the edges of the slot, but in addition the invention makes it possible to create a very large gap, at least equal (between 80% and 120%) to the thickness of the panel that is to be cut.

Thus, when the blade is in the closed position and the movable support is in the retracted position, the blade 20 is spaced apart from each longitudinal edge 3a-3b of the slot 3 of the fixed support by a gap L1 that is equal to or greater than a thickness e1 of a first panel that is to be cut, and, when the blade is in the closed position and the movable support 30, 40, 50, 60 is in the engagement position, the blade 20 is spaced apart from each longitudinal edge of the slot 33, 43, 53, 63 of the movable support by a gap L2 (or respectively L3 or L4 or L5) that is equal to or greater than a thickness e2 (or respectively e3 or e4) of a second panel that is to be cut, of thickness less than the thickness e1 of the first panel to be cut.

Thus, for a blade of thickness Lt of 6 mm, and for cutting panels of thickness e1 of 13 mm and panels of thickness e2 of 6 mm, the slot 3 of the fixed support 10 will advantageously have a width Lfmax of 32 mm (13 mm+13 mm+6 mm), and the slot 33 of the movable support 30 will advantageously have a width Lf of 18 mm (6 mm+6 mm+6 mm). In such a case, it is particularly advantageous to have multiple movable supports 30, 40, 50 to make it possible to cut a large number of panel thicknesses.

Of course, a person skilled in the art can adapt the various slot widths of the fixed support and of the movable support(s) depending on the panels usually used.

One advantageous (since convenient and not costly) technical solution for ensuring that the blade is always held at a distance from the edges of the slot during cutting is to use spacers 70 between the blade and the movable support.

Preferably, these spacers are positioned on the pivot, such that the blade is mounted so as to be able to pivot on the movable support by means of the pivot provided with the spacers.

These have a given thickness in order that the blade is spaced apart from the longitudinal edges of the slot of the movable support during cutting. In the retracted position, the gap is maintained by the spacers 70 and by the movable support(s).

The use of a tool according to the invention makes it possible to modify and adapt, in a simple manner, the width of the slot to the thickness of the panels that are to be cut. Assembly is easy and the tool is simple and economical to manufacture.

Since the movable support(s) are held captively about the rotation pin, there is no risk of their being lost. Moreover, their engagement position is reliable, such that there is no risk of their inadvertently sliding or pivoting during cutting, since the panel presses vertically on the movable support(s), that is to say in a different direction from their sliding or pivoting movement.

By virtue of the presence of the gaps L1, L2, L3, L4 or L5, cutting of a panel made of reconstituted material is easy in comparison to an identical tool in which the slot has a width equal to the blade width.

By choosing gaps that are equal to or greater than the thickness of the panel that is to be cut, it is possible, using a compact tool (that is to say one having a small lever arm) to cut panels of considerable thickness (between 6 and 15 mm).

The invention makes it possible to propose a tool having a smaller lever arm, thus limiting the space requirement and the risk of twisting, and hence the tool can be less rigid, therefore more lightweight and less costly to manufacture, with no risk of losing the movable supports that remain captive on the rotation pin of the blade.

The invention claimed is:

1. A cutting tool (100, 200, 300) for cutting a panel which is made of reconstituted material and which has a given thickness (e1, e2, e3, e4) the tool comprising a fixed support (10) on which a blade (20), having a given blade width (Lt), is mounted so as to be able to pivot by means of a pivot (21), between an open position for receiving the panel which is to be cut, and a closed position at the end of a cut, the fixed support (10) comprising a portion (2) that is provided with a first slot (3) which receives at least part of the blade (20) during the cut, the first slot (3) comprising two longitudinal edges (3a-3b) that are spaced apart from one another by a first slot width (Lfmax) which is strictly greater than the blade width (Lt) such that the blade (20) is spaced apart from each longitudinal edge (3a-3b) of the first slot (3) and does not come into contact with said longitudinal edges of the first slot when passing from the open position to the closed position, characterized in that the tool comprises at least one movable support (30, 40, 50, 60) that is mounted so as to be able to move about the rotation pin of the blade between an engagement position in which the movable support (30, 40, 50, 60) is arranged within the first slot and between the longitudinal edges (3a-3b) of the first slot (3) of the fixed support (10), and a retracted position in which the movable support (30, 40, 50, 60) moves in and away from the first slot between the longitudinal edges of the first slot of the fixed support, said at least one movable support (30, 40, 50, 60) comprising a second slot (33, 43, 53, 63) of a width (Lf, 11, Lf2, 143) smaller than the width (Lfmax) of the first slot (3) of the fixed support (10), and greater than the width (Lt) of the blade (20).

2. Cutting tool (100, 200, 300) according to claim 1, in which said at least one movable support (30, 40, 50, 60) comprises e cutout (31) in which is engaged the rotation pin of the blade, such that the movable support (30, 40, 50, 60) is mounted so as to be able to move about the rotation pin (21) of the blade (20), between the engagement position and the retracted position.

3. Cutting tool (100, 200) according to claim 2, in which the cutout (31) borne by the movable support (30, 40, 50) is oblong, such that the movable support (30, 40, 50) is mounted so as to be able to slide with respect to the rotation pin (21) of the blade (20).

4. Cutting tool (100, 200) according to claim 3, in which the fixed support (10) comprises an adjustment slot (4) in which is mounted, so as to be able to slide, a gripping tab (34) that is fixed to the movable support (30).

5. Cutting tool (300) according to claim 2, in which the cutout borne by the movable support is circular, such that the movable support (60) is mounted so as to be able to pivot with respect to the rotation pin (21) of the blade (20).

6. Cutting tool (300) according to claim 5, in which the movable support (60) comprises two longitudinal flanks (62), each one provided with a bearing portion (62a) designed to cover the longitudinal edges (3a-3b) of the slot (3) of the fixed support (10) in the engagement position.

7. Cutting tool (100, 200, 300) according to claim 1, in which the movable support (30, 40, 50, 60) comprises two longitudinal flanks (32, 42, 52, 62) that are spaced apart from one another by a distance (Lf, Lf1, Lf2, Lf3) smaller than the slot width (Lfmax) between the two longitudinal edges (3a-3b) of the fixed support (10) and greater than the width (Lt) of the blade (20), each flank (32, 42, 52, 62) being provided with a cutout (31) in which is engaged the rotation pin (21) of the blade (20), such that the movable support (30, 40, 50, 60) is mounted so as to be able to move about the rotation pin of the blade, between the engagement position and the retracted position.

8. Cutting tool (100, 200) according to claim 7, in which each flank (32) comprises a bearing portion (32a) that is designed to slide along the edges (3a-3b) of the slot (3) of the fixed support (10), and a guiding portion (32b) that is arranged against the fixed support (10), at a distance from the bearing portion (32a), such that the movable support (30) is guided in translation.

9. Cutting tool (100, 200, 300) according to claim 1, in which, when the blade is in the closed position and the movable support is in the retracted position, the blade (20) is spaced apart from each longitudinal edge (3a-3b) of the slot of the fixed support by a gap (L1) that is equal to or greater than a thickness (e1) of a first panel that is to be cut, and in which, when the blade is in the closed position and the movable support is in the engagement position, the blade (20) is spaced apart from each longitudinal edge of the slot (33) of the movable support by a gap (L2) that is equal to or greater than a thickness (e2) of a second panel that is to be cut, of thickness (e2) less than the thickness (e1) of the first panel to be cut.

10. A cutting tool (100, 200, 300) according to claim 1, in which the blade (20) is mounted so as to be able to pivot on the support (10) by means of a pivot (21) provided with spacers (70) of a given thickness so that the blade is spaced apart from the longitudinal edges (3a-3b) of the first slot during cutting.

11. A cutting tool (100, 200, 300) according to claim 1, comprising multiple supports (40, 50) that are U-shaped and stacked into each other and have an oblong cutout that receives the rotation pin (21) of the blade (20).

* * * * *